United States Patent [19]

Schurman

[11] 4,078,657
[45] Mar. 14, 1978

[54] TAPE CASSETTE CASE

[75] Inventor: Peter T. Schurman, Woodbridge, Conn.

[73] Assignee: Plastic Forming Company, Inc., Woodbridge, Conn.

[21] Appl. No.: 770,443

[22] Filed: Feb. 22, 1977

[51] Int. Cl.² .......................................... B65D 85/672
[52] U.S. Cl. ................... 206/387; 206/45.14; 206/493; 220/1 A; 312/190
[58] Field of Search ............ 312/190, 10, 14, 15; 220/1 A; 206/387, 45.14, 252, 255, 354, 355, 444, 493, 565, 576

[56] References Cited

U.S. PATENT DOCUMENTS

| 1,445,695 | 2/1923 | Lewis | 206/252 |
|---|---|---|---|
| 2,287,487 | 6/1942 | Roberts | 206/355 |
| 2,344,961 | 3/1944 | Benjamin | 206/355 |
| 2,726,787 | 12/1955 | Nelson | 206/355 |
| 2,899,105 | 8/1959 | Testi | 206/355 |
| 3,876,071 | 4/1975 | Neal et al. | 206/493 |
| 3,896,929 | 7/1975 | Mills | 206/493 |
| 3,990,575 | 11/1976 | Egly et al. | 206/387 |
| 3,995,921 | 12/1976 | Ackeret | 206/387 |

FOREIGN PATENT DOCUMENTS 2,542,622  8/1976  Germany ............................ 206/387

OTHER PUBLICATIONS

IBM Technical Disclosure, 2-1966, p. 1184, Arenholz et al.

*Primary Examiner*—William Price
*Assistant Examiner*—Bruce H. Bernstein
*Attorney, Agent, or Firm*—St. Onge, Mayers, Steward & Reens

[57] ABSTRACT

A case is disclosed for storing and transporting a tape cassette having at least one tape reel that includes a clutch element registrable with a corresponding driving spindle of a reel drive mchanism so that the reel may be rotated. The case comprises a base formed to receive the cassette and a non-rotating latch pin registrable with the clutch element of the reel to prevent reel rotation and, hence, unwinding of stored tape. The latch pin is mounted with the base by a leaf spring assembly which permits the pin to retract to accommodate the cassette when not registered with the clutch element. However, the spring assembly urges the pin into reel-rotation preventing engagement with the element when the two are registered.

16 Claims, 7 Drawing Figures

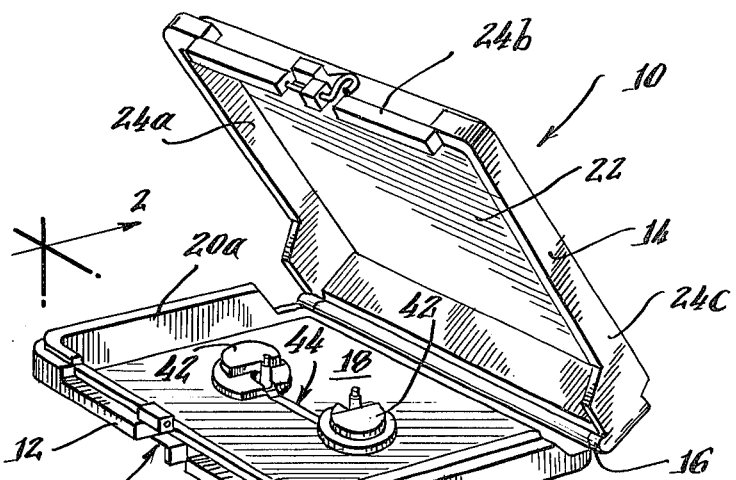
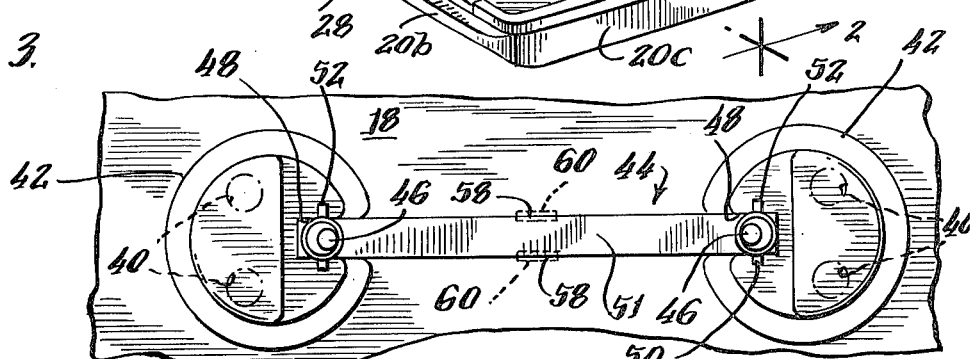
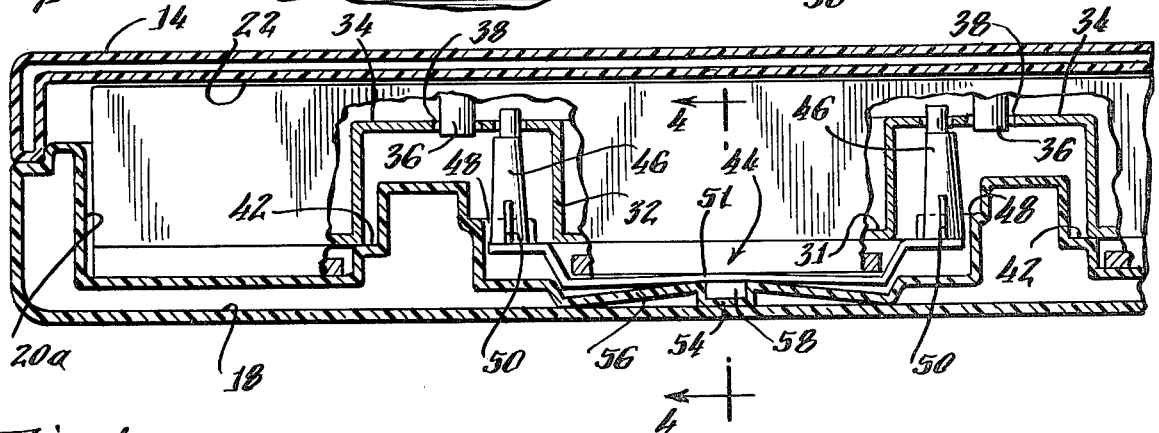
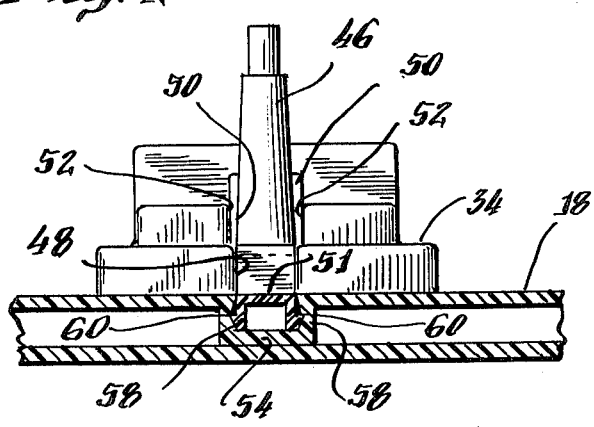
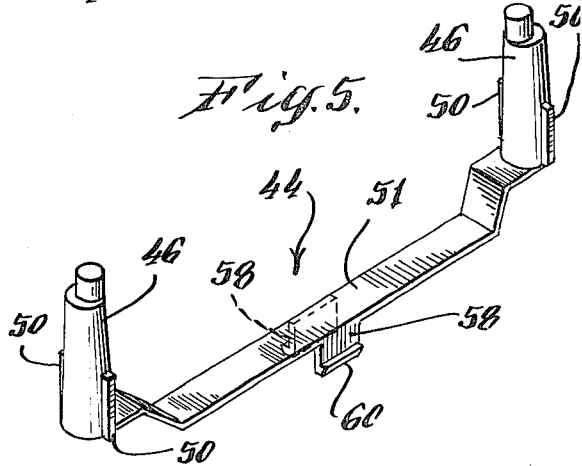

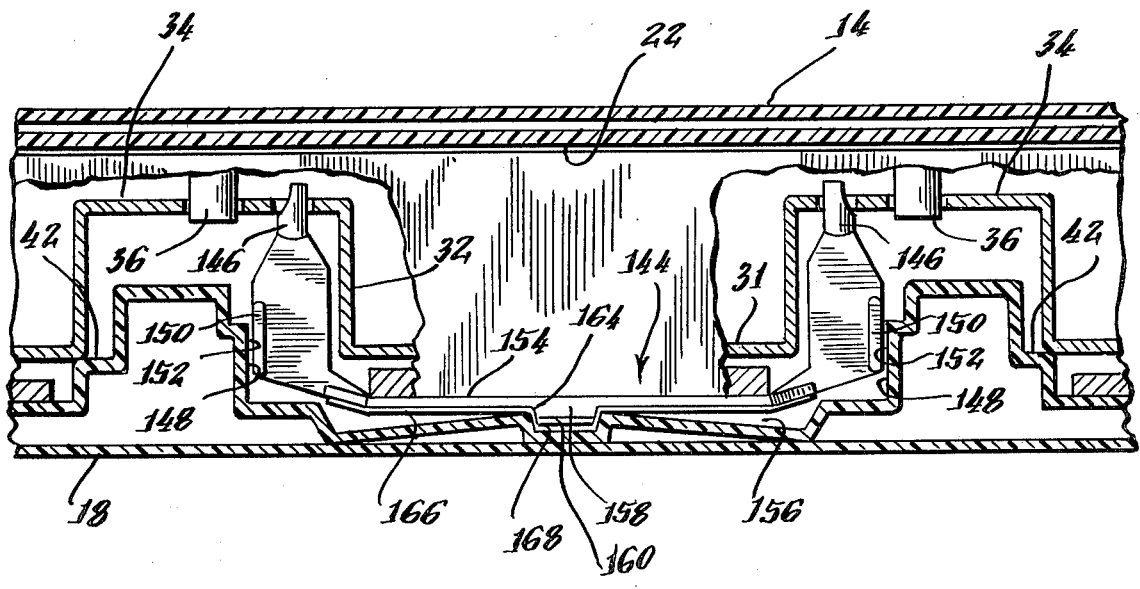
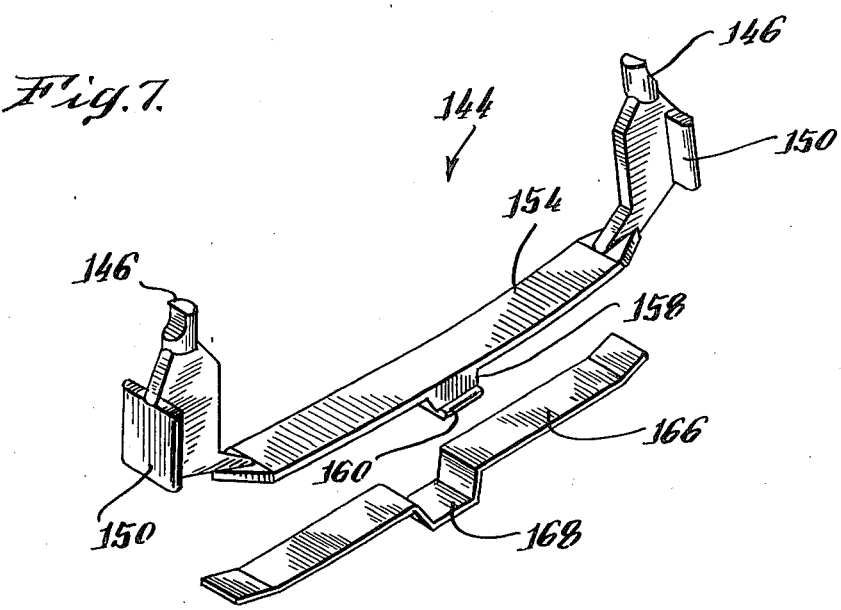

TAPE CASSETTE CASE

BACKGROUND OF THE INVENTION

1. Field of the Invention

The present invention relates to a case for a cassette which holds tape-like material such as magnetic video or audio recording tape as well as other kinds of tape.

Video and audio recording tapes are now in wide use because they provide a convenient, long-lived, high fidelity medium for recording varied subject matter. Cassette cartridges have been developed for these and other types of tapes that provide access to the tape yet protect it from damage. Ordinarily such cassettes include a housing in which two reels are mounted for rotation. Each reel has a clutch element at its hub that may be registered with the driving spindle of a reel drive mechanism so that tape may be wound onto one reel while unwound from the other. The tape may be rewound by driving the unwinding reel in the opposite direction.

The cassette also has an access opening which permits the tape to be connected to a recording, playback or similar apparatus that operates on the tape.

Other tape cassettes, which store endless tapes, include a housing having only one reel equipped with a clutch element. The tape is continuously cycled through the cassette by driving the reel in one direction only.

It has been found that the agitation or vibration during storage and transport of tape cassettes such as those described above can cause a tape reel to rotate in its housing and thus cause the tape to unwind from it. When this happens, the tape may bind, fold, or otherwise be damaged. Therefore, it is desirable to store such tape cassettes in a manner that will prevent the tape reels from rotating and, hence, prevent the tape stored on them from unwinding.

2. Description of the Prior Art

Cases which are designed to hold tape cassettes for storage and transport are known. One such case, for a double reel cassette, includes a base that receives the cassette. Two projecting lugs are formed with the base, each of which carries a rubber washer that frictionally engages the hub of one reel. A cover is hinged to the base and, when closed, forces each reel into firm contact with the rubber washer to thereby resist reel rotation.

This tape cassette case has certain drawbacks. After continued use, the rubber washers may wear, reducing the frictional forces between them and the reel hubs. Accordingly, they may become less effective in preventing reel rotation. Further, if the cover is not tightly closed, the washers and reel hubs may not firmly engage and again their effectiveness in reducing reel rotation is reduced.

U.S. Pat. No. 3,876,071 (Neal et al.) discloses a storage container for a tape cassette which includes two cylindrical hubs. A pair of cylindrical bosses engage the hubs. Each boss is equipped with a separate assembly having a spring loaded button that is urged to a position locking the cassette hubs by projecting into a hub drive hole. The mounting arrangement for each button assembly includes four prongs which are received in complementary sockets in the bosses in order to prevent button assembly rotation. When the container is assembled, each button assembly must be accurately positioned for proper locking against rotation on its boss. Moreover, this container locking arrangement including the spring assemblies has a relatively larger number of parts.

SUMMARY OF THE INVENTION

In a preferred embodiment, to be described below in detail, the tape cassette case of the present invention prevents rotation of the cassette reels during cassette transport and storage to, in turn, prevent the tape from unwinding and becoming damaged in the cassette. Reel rotation is prevented by a latching arrangement which positively interlocks with the tape reels in the cassette and is not dependent upon frictional forces. Further, the case has few parts which are easily assembled.

In its preferred embodiment, the tape cassette comprises a base which is shaped to receive the tape cassette. Two latch pins are associated with the base and are each registrable with one reel clutch element to prevent rotation of the tape reel in the cassette. For example, the reels in video tape cassettes have hubs formed with three equally spaced holes that are engagable by complementary pins in a drive mechanism. The latch pins of the cassette case of the present invention are each adapted to project, in interlocking engagement, through one of these holes.

A leaf spring assembly interconnects the latch pins with the base and each other so that the pins may retract toward the base to accommodate the cassette when one pin is not registered with a clutch element of the reel. However, the latch pins are urged by the spring assembly into reel-rotation preventing engagement with the clutch elements when registered.

Accordingly, the reel may be positioned on the base without care for whether or not a latch pin is registered with the reel clutch element. However, if the reel should initially rotate due to agitation or vibration during transportation or storage of the case, each latch pin will engage one clutch element, as soon as they are registered, under the influence of the leaf spring assembly. Therefore, further reel rotation is prevented. Although a top may be hinged to the case to force the cassette into engagement with the latch pins, such a top is not essential, particularly when the cassette itself has such significant weight that it bears against the pins.

Accordingly, it is an object of the present invention to provide a tape cassette case which prevents cassette reel rotation and hence tape damage during storage and transportation. Other objects, aspects, and advantages of the present invention will be pointed out in and will be understood from, the following detailed description provided below in conjunction with the accompanying drawings.

BRIEF DESCRIPTION OF THE DRAWINGS

FIG. 1 is a perspective view of the tape cassette case of the present invention.

FIG. 2 is a vertical cross-sectional view taken through plane 2—2 in FIG. 1 illustrating the latch pin and leaf spring assembly.

FIG. 3 is a top plan view of the latch pin and spring assembly.

FIG. 4 is a vertical cross-sectional view taken through plane 4—4 looking toward the left showing the arrangement for attaching the spring assembly and latch pin to the base.

FIG. 5 is a perspective view of an injection molded plastic leaf spring assembly-latch pin combination.

FIG. 6 is a vertical cross-sectional view similar to that shown in FIG. 2 of a latch pin and spring assembly of a second embodiment.

FIG. 7 is an exploded perspective view of the latch pin and spring assembly of this second embodiment.

DETAILED DESCRIPTION OF THE PREFERRED EMBODIMENTS

FIG. 1 illustrates the tape cassette case, generally indicated at 10, constructed in accordance with the preferred embodiment of the present invention. This case is designed to accommodate a video tape cassette for storage and transport. However, the case 10 may be adapted to transport and store any other type of tape cassette such as an audio tape cassette or a single reel endless tape cassette.

The case 10 includes a base 12 and a cover 14 interconnected at one edge by a conventional hinge 16. Both the base and cover may be made by conventional blow molding techniques from a thermoplastic resin. However, the case may be made of any other suitable material such as metal or plastic using other known techniques.

The base 12 is formed with a bottom 18 and upstanding side walls 20 which are shaped to closely conform to the edges of a video tape cassette C shown in FIG. 2. Similarly, the cover 14 has a top 22 and depending side walls 24 which are formed to interfit with the base by overlapping the base side walls 20 as shown in detail in FIG. 2. A latch, generally indicated at 26, is mounted on the front side wall 24b of the cover 14 and is adapted to engage a catch, generally indicated at 28, formed on the front side wall 20b of the base 12 to hold the cover and base together when closed.

As can be seen in FIG. 2, the cassette C, which may be stored and transported in the case 10, includes a housing 30 that supports two reels 31 having central hubs 32. Each hub is open at one end and enclosed by a web 34 at its opposite end. A shaft 36 is formed with the inside top wall 38 of the cassette housing 30 and depends through an axial hole 38 disposed through the hub web 34. Accordingly, the hub and, hence, the entire reel may freely rotate about the hub on shaft 36.

The hub web 34 is also formed with three equally spaced holes 40, shown by phantom lines in FIG. 3, that thus define a clutch element. A typical reel drive mechanism has a driving spindle equipped with three similarly spaced pins that engage the holes 40 to rotate each hub and hence advance the tape from one reel to another for recording or playback. These holes 40 are utilized by the case of the present invention to latch the reels in non-rotating condition in a manner described below in detail.

As shown in FIGS. 1 through 4, the base 12 of case 10 further includes two upwardly projecting lugs 42 which are spaced and positioned to be received in the open end of reel hubs 32. Accordingly, lugs 42, in conjunction with the shape of the base 18, precisely locate the cassette C in the case 10.

The case also comprises a latch pin-spring mounting assembly generally indicated at 44 which positively prevents tape reel rotation when the cassette is received on the base 12. The assembly 44 includes two latch pins 46 which are mounted for free reciprocal, axial movement in sockets 48 molded in lugs 42. Further, each latch pin is provided with two radially outwardly directed axially extending tabs 50 which freely interengage mating radially outwardly directed slots 52 formed in the sides of sockets 48. Accordingly, each pin may move upwardly and downwardly in the sockets 48 but may not be rotated therein.

The latch pin-spring mounting assembly further comprises a leaf spring 54 positively connected at each of its ends with one latch pin 46 and positively connected at its center with the base 18 of case 10. The base 18 is formed with an inverted V-shaped recess 56, shown in detail in FIGS. 2 and 4, that accommodates the leaf spring 54. Further, at its center, leaf spring 54 is molded with two depending tabs 58, each of which has an elongated outwardly directed flange 60. Each of these flanges is interengaged with a mating rabbet 62 formed at the vertex 64 of inverted V-shaped recess 56 (FIG. 4). Accordingly, each latch pin may be depressed in its socket against the urging of leaf spring 54. However, when free, each latch pin is urged upwardly by this spring to a position shown in FIG. 2.

The case of the present invention operates to prevent reel rotation during transportation and storage as follows. The cassette C is first placed on the base 18 of case 10 with the hubs of both of its reels engaged over lugs 42. If one of the clutch elements holes 40 in hub web 34 happens to be registered with a pin 56, the pin immediately projects therethrough to lock the associated reel against rotation (FIG. 2). However, if a hole and the pin are not registered and the head of the pin abuts a hub web, the weight of the cassette or the force of cover 14 when closed, urging it downwardly, will press the pin 46 downwardly into its socket 48 against the urging of leaf spring 54. However, when the reel begins to rotate due to agitation or vibration and the top of pin 46 comes to registration with one of the clutch element holes 40, the pin will immediately spring upwardly to project through that hole. Therefore, the maximum amount of rotation permitted for a reel of the type described above is 120°, namely the angular separation between adjacent holes in the hub web 34.

Although the cover 14 enhances the positive interengagement of the reel hub and the latch pins 44, it is not absolutely necessary, particularly when the cassette has significant weight of its own. Moreover, it can be seen that the positive interengagement of the latch pin and reel does not depend upon sliding frictional forces. Therefore, extended use is not likely to wear the pins and degrade their ability to positively lock the tape reels against rotation. Moreover, the cassette case of the present invention has advantages of both economy and ease of manufacture since it is simple and easy to assemble and may be fabricated using conventional blow molding and injection molding techniques.

In certain applications of the present invention, it may be desirable to increase the force with which the latch pins 46 are urged upwardly into engagement with holes 40 in the hub web 34 of tape cassette reels 31. The second embodiment of the invention is designed for these applications.

As shown in FIGS. 6 and 7, the second embodiment includes a latch pin-spring mounting assembly which is generally indicated at 144. This assembly is similar to that of the first embodiment in that it includes two latch pins 146 that are mounted for free reciprocal axial movement in open channels 148 molded in lugs 42 of the cassette case bottom. The body or throat of each pin is generally planar and has radially sidewardly directed tabs 150. Each pin and its associated tabs therefore have a T-shaped cross section. This configuration provides improvement in molding capability at the throat where each pin joins its bridging leaf spring, as further discussed below. The tabs 150 are freely guided for vertical movement in close, yet noninterferring proximity to mating, generally planar rear walls 152 of channels 148. Accordingly, each pin may move upwardly and downwardly in the channels 148, yet is restrained against rotation relative to lugs 42.

Further, the latch pin-spring mounting assembly of the second embodiment again comprises a bridging leaf spring 154 positively connected at each of its ends with one latch pin 146 and at its center with the base 18 of the case 10. As was the case with the first embodiment, the base is formed with an inverted V-shaped recess 156, shown in FIG. 6, that accommodates the bridging or interconnecting leaf spring. Further, at its center, the leaf spring 154 is molded to provide a single depending tab 158, having width equal to that of the leaf spring, that has two opposing elongated outwardly directed flanges 160. The flanges are interengageable with mating rabbets 162 formed at the vertex 164 of the inverted V-shaped recess in a manner similar to that shown in FIG. 4. Accordingly, each latch pin may be depressed in its socket against the urging of the interconnecting or bridging leaf spring 154.

As shown in FIG. 7, the latch pins 146 are canted slightly toward each other. Since the planar throat configuration of this pin arrangement results in added strength but less flexibility at the point of attachment between the pin and the integral leaf spring 154, as compared to the first embodiment, the pins assume a generally parallel relationship when depressed in their respective sockets upon placement of a cassette in the case.

The second embodiment also includes an auxiliary leaf spring 166 which lies between the integral leaf spring 154 and the base of the V-shaped recess 156. The auxiliary leaf spring has a contour that generally conforms to the bottom of the integral leaf spring in its non-distorted form.

As shown in FIGS. 6 and 7, the auxiliary spring is formed with a notch 168 which interfits with the single tab 158 that secures the latch pin spring assembly to the base. In this manner, lateral movement of the auxiliary spring is prevented. Further, the auxiliary spring may be accurately positioned during assembly by this notch and its interengagement with the spring assembly block.

The auxiliary spring is preferably made of a highly resilient material such as spring steel which has a high spring constant and should have significantly higher spring constant than the material from which the integrally formed leaf spring and pin assembly 144 is made. This material may be plastic, for example. Therefore, it can readily be appreciated that the interconnecting leaf spring and auxiliary leaf spring combine to positively urge each latch pin upwardly against any depressing force.

From the above description it can readily be appreciated that the second embodiment functions in a manner similar to that of the first. However, of course, the latch pins may more positively be urged upwardly by use of the auxiliary leaf spring.

Although preferred embodiments of the present invention have been described above in detail, it is to be understood that this is merely for purposes of illustration. Modifications may be made to the described tape cassette cases by those skilled in the art in order to adapt them to particular applications.

What is claimed is:

1. A case for a tape cassette having two reels on which tape may be wound, each reel having a clutch element in the form of a cylindrical hub having an axis coincident with the axis of rotation of the reel and being open at one end and enclosed by a web at the opposite end, the web having at least one hold therein, not coincident with the axis of rotation of the reel, registrable with the driving member of a reel drive mechanism to rotate the reel, said case comprising:

A. a base formed to receive the cassette;
B. a pair of latch pins, each formed to project into one hub hole of one hub when registered therewith to prevent reel rotation; and
C. a leaf spring having one point of positive attachment with said base intermediate its ends, each of said latch pins being positively attached to one end of said leaf spring, said leaf spring being cantilevered from its point of positive attachment with said base to the positive attachment with each of said latch pins to urge both pins away from said base into reel rotation preventing engagement with one hub hole when registered with the hole but permitting each of said latch pins to retract toward the base when the hub hole and pin are not registered but said pin abuts the hub web.

2. The tape cassette case as claimed in claim 1 wherein said base further comprises two lugs, each formed to be received in the open end of one reel hub to thereby locate the cassette on said base, each of said latch pins projecting outwardly from one of said lugs.

3. The tape cassette case as claimed in claim 1 further comprising:
means for preventing rotation of each of said latch pins about its axis.

4. The tape cassette case as claimed in claim 3 wherein said base is formed with two sockets, each for receiving one of said latch pins for axial reciprocal movement and to form a pin-socket pair and wherein said rotation preventing means for each pin-socket pair comprises:
1. an axially extending, radially directed tab formed on one of said latch pin and base socket; and
2. an axially extending, radially directed slot for receiving said tab formed on the other of said latch pin and base socket.

5. The tape cassette case as claimed in claim 1 wherein said base is formed with a leaf spring accommodating recess having an inverted V-shaped cross-section, said one point of spring attachment with said base being at the vertex of said V-shaped recess, the remaining portions of said recess accommodating flexure of said leaf spring toward said base to retract said latch pins.

6. The tape cassette case as claimed in claim 1 further comprising:
a cover hinged to said base for closing movement theretoward, said cover urging said cassette clutch element toward said latch means when closed.

7. A case for a tape cassette having two reels on which tape may be wound, each reel having a clutch element in the form of a cylindrical hub having an axis coincident with the axis of rotation of the reel and being open at one end and enclosed by a web at the opposite end, the web having at least one hole therein, not coincident with the axis of rotation of the reel, registrable with the driving member of a reel drive mechanism to rotate the reel, said case comprising:
A. a base formed to receive the cassette;

B. a pair of latch pins, each formed to project into one hub hole of one hub when registered therewith to prevent reel rotation;

C. an integral leaf spring having one point of positive attachment with said base intermediate its ends, each of said latch pins being positively attached to one end of said leaf spring; and D. an auxiliary leaf spring lying between said base and said integral leaf spring, said integral and auxiliary leaf springs being arranged to urge both pins away from said base into reel rotation preventing engagement with one hub hole when registered with the hole but permitting each of said latch pins to retract toward the base when the hub hole and pin are not registered but said pin abuts the hub web.

8. The tape cassette case as claimed in claim 7 wherein said base further comprises two lugs, each formed to be received in the open end of one reel hub to thereby locate the cassette on said base, each of said latch pins projecting outwardly from one of said lugs.

9. The tape cassette case as claimed in claim 7 further comprising:
means for preventing rotation of each of said latch pins about its axis.

10. The tape cassette case as claimed in claim 9 wherein said base is formed with two sockets, each for receiving one of said latch pins for axial reciprocal movement and to form a pin-socket pair and wherein said rotation preventing means for each pin-socket pair comprises:
1. an axially extending, radially directed tab formed on one of said latch pin and base socket; and
2. an axially extending, radially directed slot for receiving said tab formed on the other of said latch pin and base socket.

11. The tape cassette case as claimed in claim 10 wherein said latch pins are planar and wherein said tabs are formed with said latch pins to yield a T-shaped cross section.

12. The tape cassette case as claimed in claim 7 wherein said base is formed with a leaf spring accommodating recess having an inverted V-shaped cross-section, said one point of integral leaf spring attachment with said base at the vertex of said V-shaped recess, the remaining portions of said recess accommodating flexure of said leaf springs toward said base to retract said latch pins.

13. The tape cassette case as claimed in claim 12 wherein integral leaf spring is formed with flange means for attaching said integral leaf spring to said base.

14. The tape cassette case as claimed in claim 13 wherein said auxiliary leaf spring is formed with a notch for accommodating said flange means when assembled between it and said base.

15. The tape cassette case as claimed in claim 7 wherein said auxiliary leaf spring is contoured to conform to said integral leaf spring.

16. A case for a tape cassette having two reels on which tape may be wound, each reel having a clutch element in the form of a cylindrical hub having an axis coincident with the axis of rotation of the reel and being open at one end and enclosed by a web at the opposite end, the web having at least one hole therein, not coincident with the axis of rotation of the reel, registrable with the driving member of a reel drive mechanism to rotate the reel, said case comprising:

A. a base formed to receive the cassette;

B. a pair of latch pins, each formed to project into one hub hole of one hub when registered therewith to prevent reel rotation;

C. a leaf spring having one point of positive attachment with said base intermediate its ends, each of said latch pins being positively attached to one end of said leaf spring; and D. at least one auxiliary spring lying between said base and said leaf spring, said leaf and auxiliary springs being arranged to urge both pins away from said base into reel rotation preventing engagement with one hub hole when registered with the hole but permitting each of said latch pins to retract toward the base when the hub hole and pin are not registered but said pin abuts the hub web.

* * * * *